Figure 13:
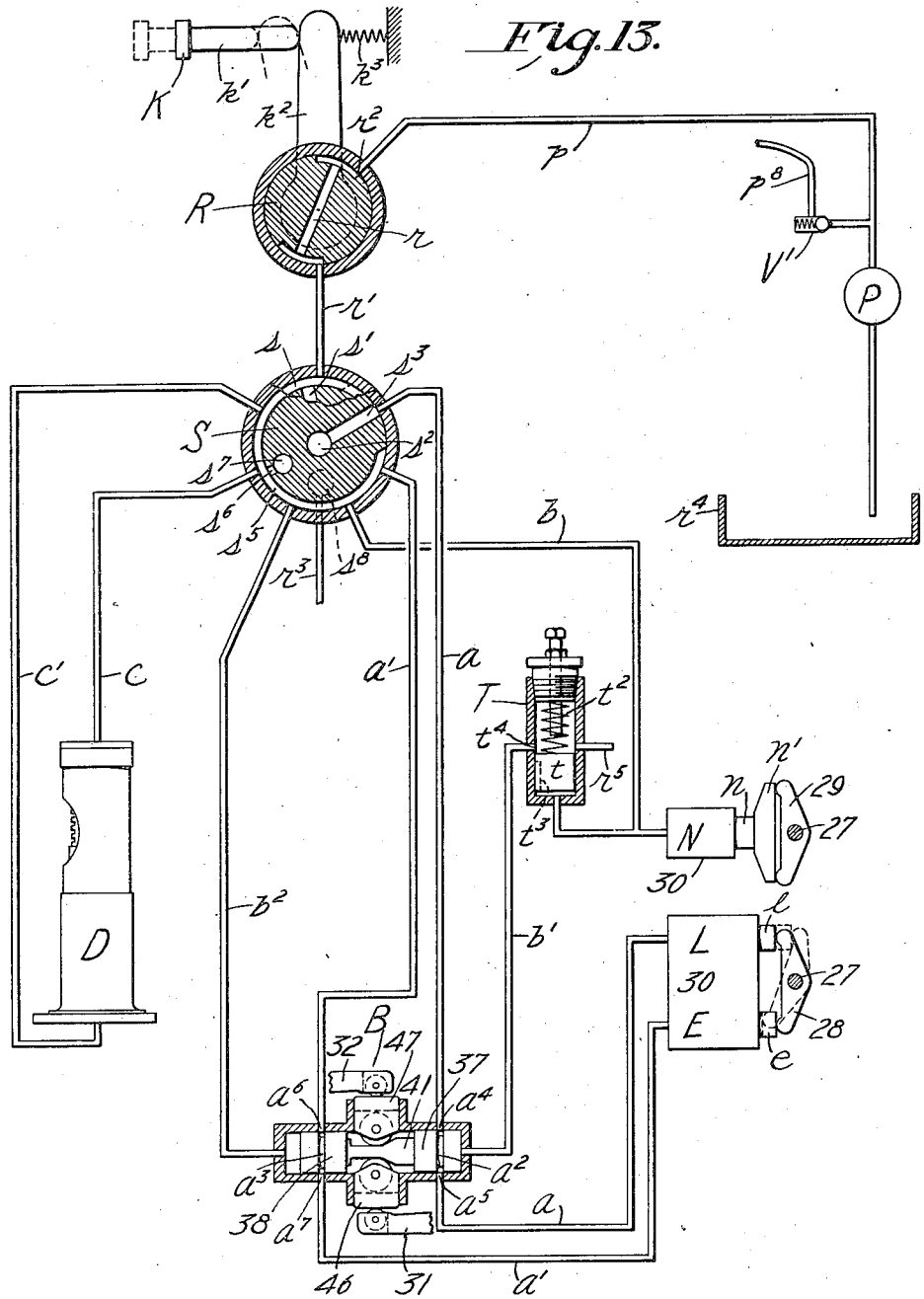

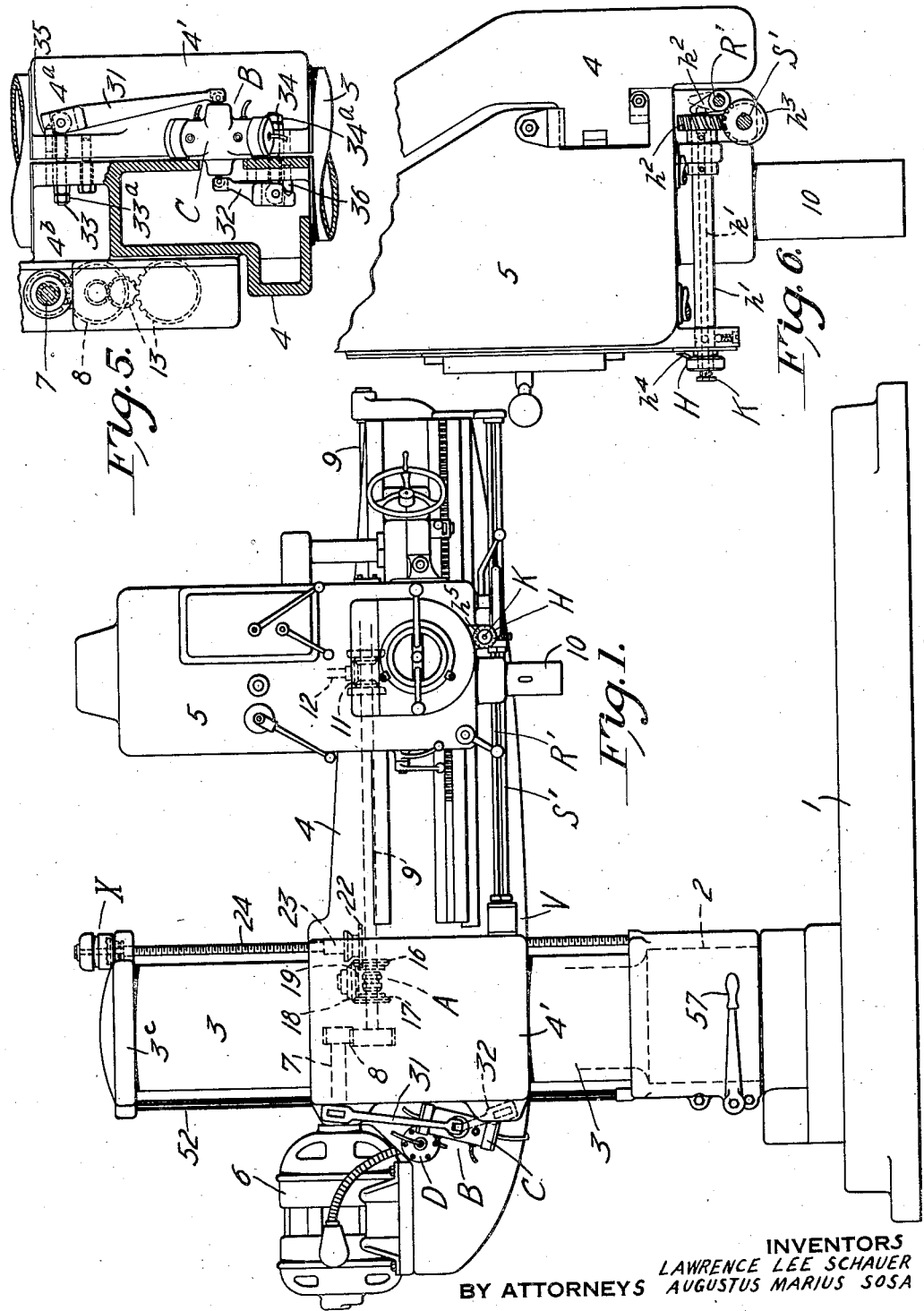

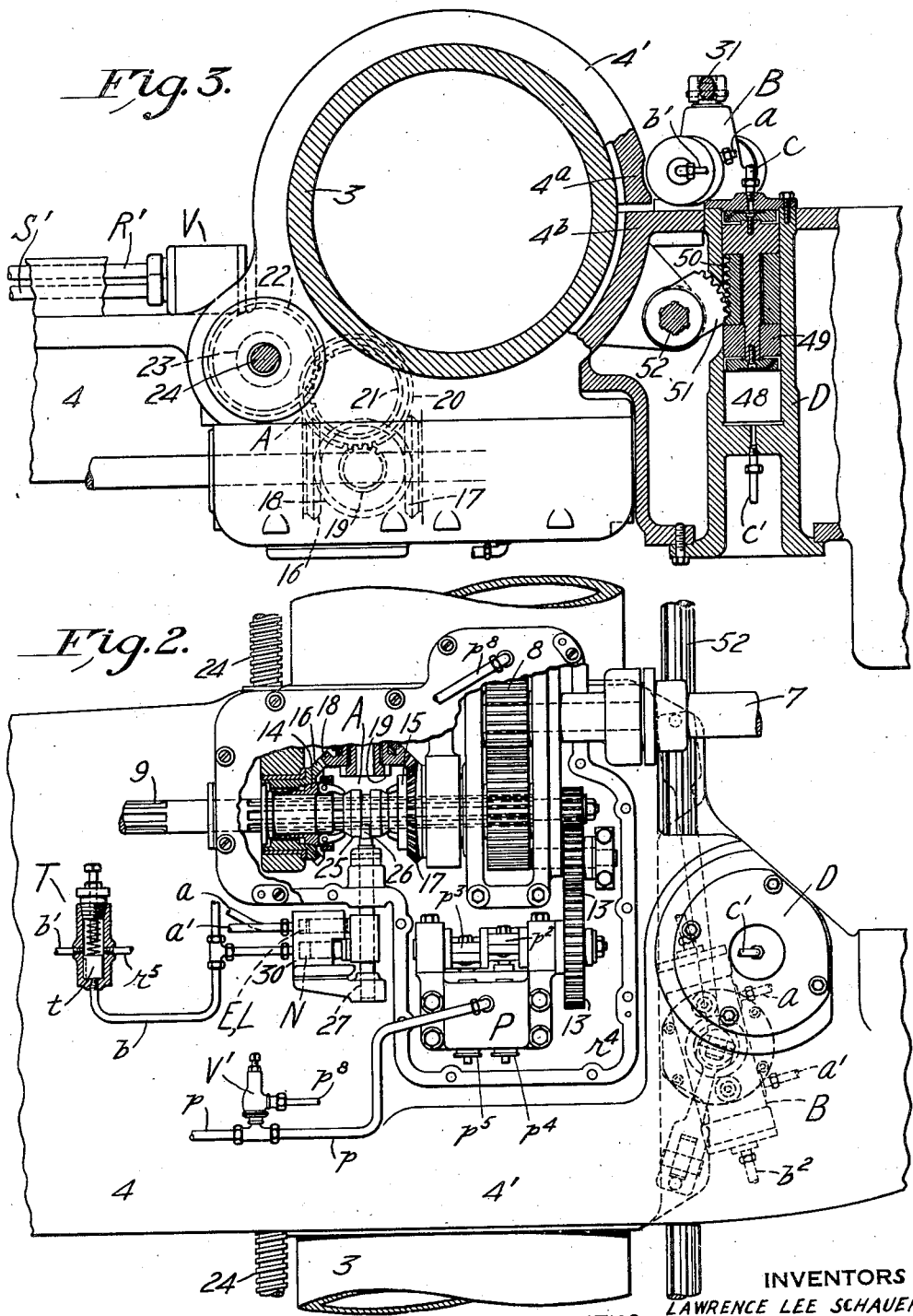

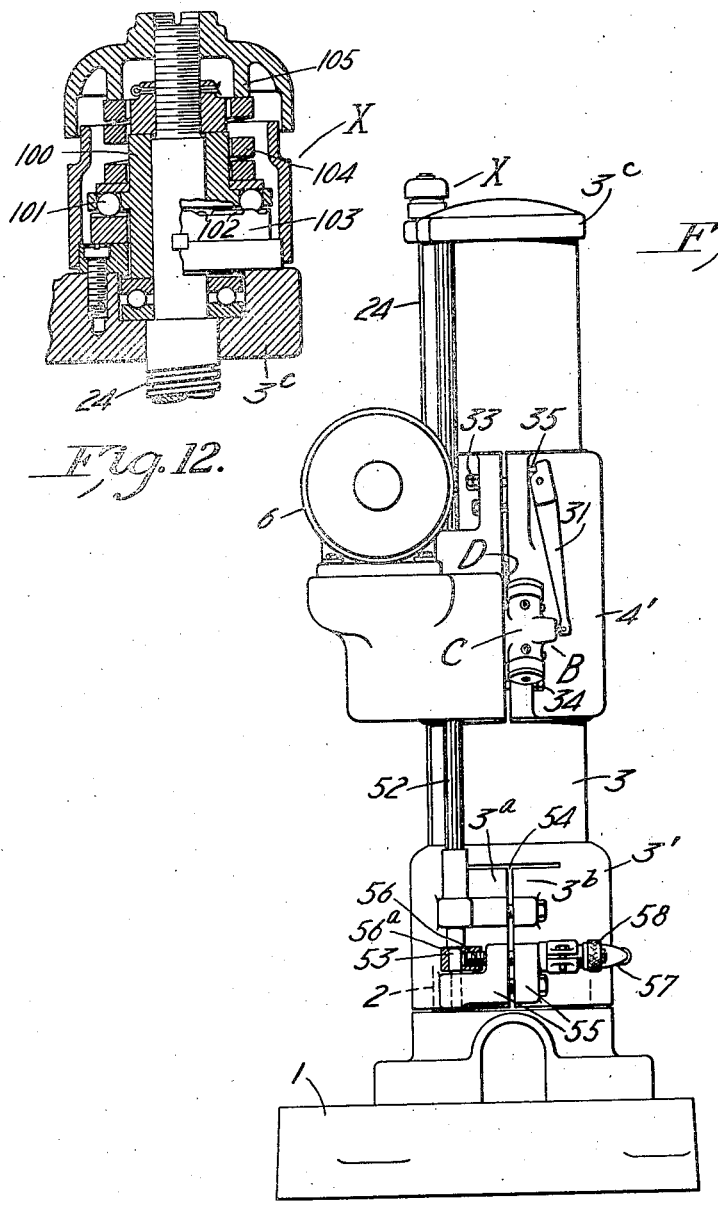

Oct. 2, 1934.   L. L. SCHAUER ET AL   1,975,589
CENTRALIZED HYDRAULIC CONTROL FOR RADIAL DRILLS
Filed Sept. 3, 1931   5 Sheets-Sheet 4
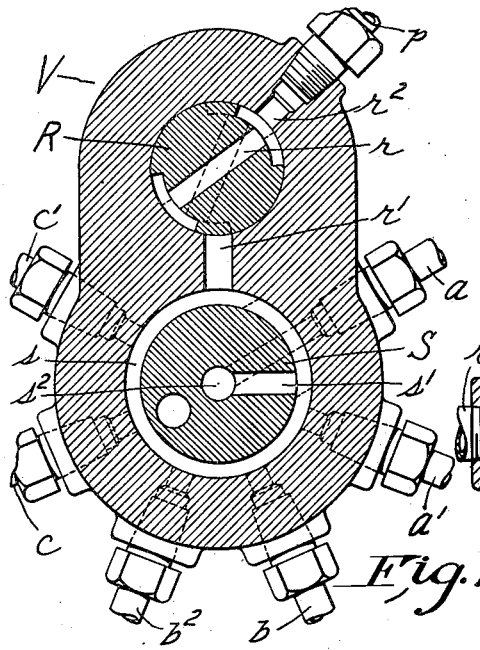
Fig. 7.
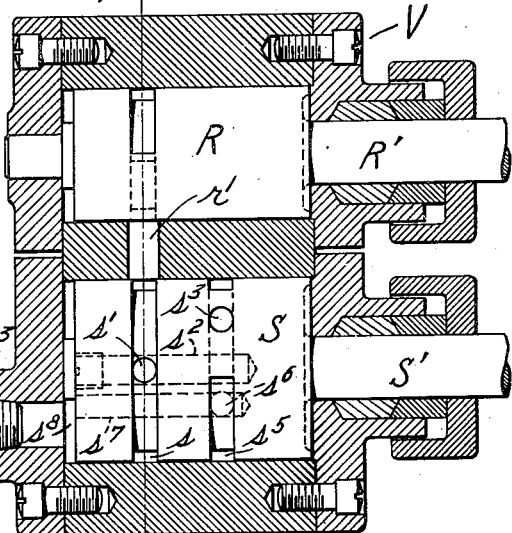
Fig. 8.
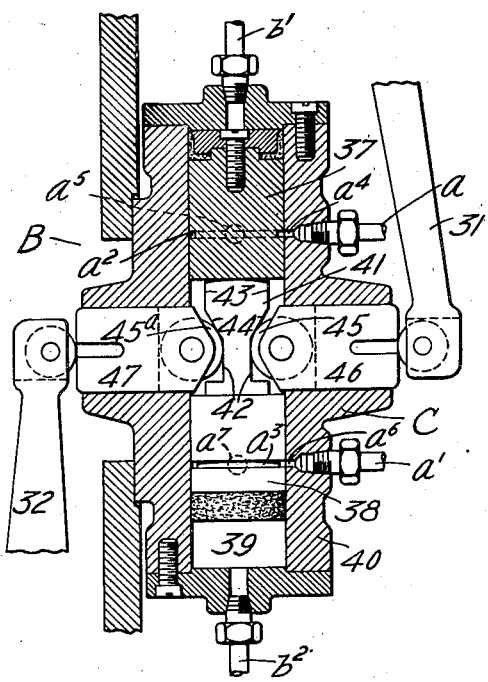
Fig. 9.
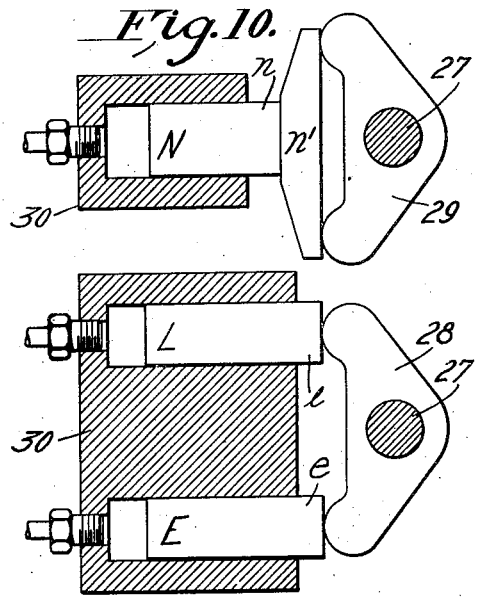
Fig. 10.
Fig. 11.
INVENTORS
LAWRENCE LEE SCHAUER
AUGUSTUS MARIUS SOSA
BY ATTORNEYS
Nathan, Bowman & Helferich Oct. 2, 1934.  L. L. SCHAUER ET AL  1,975,589
CENTRALIZED HYDRAULIC CONTROL FOR RADIAL DRILLS
Filed Sept. 3, 1931  5 Sheets-Sheet 5

INVENTORS
LAWRENCE LEE SCHAUER
AUGUSTUS MARIUS SOSA
BY ATTORNEYS
Nathan, Bowman & Helferich Patented Oct. 2, 1934

1,975,589

UNITED STATES PATENT OFFICE 1,975,589

CENTRALIZED HYDRAULIC CONTROL FOR RADIAL DRILLS

Lawrence Lee Schauer and Augustus Marius Sosa, Cincinnati, Ohio, assignors to The Cincinnati Bickford Tool Company, Cincinnati, Ohio, a corporation of Ohio Application September 3, 1931, Serial No. 561,014

11 Claims. (Cl. 77—28)

This invention relates to machine tools, and more particularly to means for interlocking and centralizing the controls of a plurality of independently operated inter-related mechanisms that compose machine tool organizations.

It has for its primary object, the grouping or collecting of various control devices into a single unit so located and arranged with respect to the working station that the operator may without changing his position exercise complete control over each mechanism, however remote from him it may be situated.

A further object of this invention is to interlock certain ones of the mechanisms with each other to insure that two or more unrelated, dependent movements of the machine elements will not occur simultaneously and as a refinement thereof to arrange the parts so that one or more units or functions of the organization may be controlled or operated independently of the others and in any sequence desired.

Still another object of this invention is to accomplish such functions as the locking of one machine element to another, the shifting of gears or clutches, etc., by means of auxiliary motors, all or some of which may be interconnected with each other to insure a prearranged operating sequence and each controlled from a common distant station.

A further object of this invention is to provide each mechanism with an independently operable prime mover of the piston and cylinder type and which are adapted to receive fluid under pressure, preferably oil, through and under control of a selector valve from a pump unit built into the machine. Many machine tools provide pumping devices for forcing lubricating oil to various parts, however, this invention proposes to eliminate the lubricating pump and to utilize the motor actuating pump unit, just mentioned, for accomplishing both purposes.

How the objects of this invention have been attained will later be described in detail and for the present it may be mentioned that for the purpose of this description, a radial drilling machine has been selected for illustrating the various features of the invention. It will be understood, however, that the invention is also applicable to other machine tools and it is not intended to be limited solely to radial drills.

A radial drill, however, offers a good illustration of the advantages to be gained and the difficulties overcome by this invention. This type of a machine is customarily provided with an upright post member on which is mounted for vertical and angular movement a horizontally extending arm member that supports the tool head. Normally the arm is adapted to be elevated and lowered by power means and swung angularly about the post manually in order to place the tool head in a predetermined position with respect to the work. And so that these movements may be effected easily and quickly the respective members are provided with complemental slidingly fitted bearing surfaces which must be rigidly and securely clamped together to maintain the parts in a definite position during the tooling operations. Clamping of the members are, in this disclosure, effected by hydraulically operated motors which are suitably connected with fluid under pressure and selectively controlled from the operator's position at the drill head.

The elevating mechanism for drill arm is also rendered effective or ineffective by hydraulically actuated means, interlocked in a novel manner with one of the clamping mechanisms, and likewise selectively controlled from the translatable tool head.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a representative type of radial drill embodying this invention. Fig. 2 is an enlarged rear view of a portion of this machine with parts broken away better to illustrate the driving mechanism. Fig. 3 is a horizontal sectional view taken through the sleeve clamping motor. Fig. 4 is an elevational view depicting the clamping mechanism at the lower end of the sleeve. Fig. 5 is a vertical sectional view through a portion of the arm and illustrating more clearly the arm clamping mechanism. Fig. 6 is a fragmentary view of the head and arm and illustrating the relative position and location of the motor control elements. Fig. 7 is a sectional view through line 7—7 of Fig. 8 which is an enlarged detail view of the selector valve. Fig. 9 is an enlarged sectional view of the arm clamping motor. Figs. 10 and 11 are detail views of the elevating clutch shifting motors. Fig. 12 is a detail view of a safety device incorporated in the arm elevating mechanism, and Fig. 13 is a diagrammatic view disclosing the main elements and connections of the hydraulic system.

Referring more particularly to the assembly view, Fig. 1, the radial drill there illustrated is provided with a base member 1 and an upright post member 2 on which is mounted a rotatable sleeve 3. A horizontally projecting arm 4, upon which are mounted the translatable tool head 5 and the main driving motor 6, is slidingly mounted upon the sleeve and adapted to be moved therealong by power means later to be described. Referring also to Fig. 2, it will be observed that the motor shaft 7 transmits unidirectional movement at a preselected rate to the arm shaft 9 through the change gears 8, and thence to the tool spindle 10, through the reversing mechanism 11, indicated by the dotted lines in Fig. 1. Suitable feed and speed change gears (not shown) are journaled in the head and convey rotary and translatory movements to the spindle 10 from the reversible shaft 12 in a conventional manner.

Arm elevating

The arm shaft 9 also drives, through gearing 13, the pump P that furnishes the fluid pressure for operating the various motors later to be referred to, and for delivering lubricant to the various parts journaled in the arm. The drive to the arm elevating mechanism is also taken from the arm shaft 9, as shown generally at A in Figs. 2 and 3, which mechanism comprises reversing clutches 14 and 15 that are adapted to connect either of the bevel gears 16 or 17 with the arm shaft 9. A third bevel gear 18, meshing with the gears 16 and 17 transmits rotary motion in reverse directions to the gears 19, 20, 21, 22 and the elevating nut 23. The nut 23 is non-translatably but rotatably journaled in the arm 4, and is adapted to cooperate with a normally stationary screw 24 for the purpose of raising or lowering the arm and parts carried thereby.

This invention proposes to effect selective operation of the clutches 14 and 15 hydraulically and to this end, individual motors E, L, and N are employed which actuate the reversing clutch spool 25 in the following manner. The spool 25 is provided with an annular groove which is tracked by a shifter fork 26 secured in an offset manner to a shaft 27, the lower portions of which carry double ended levers 28 and 29.

The actuating motors E, L, and N are carried in a housing 30 and located adjacent the levers 28 and 29, the piston e of the elevating motor E being in engagement with one end of the lever 28, the piston l of the arm lowering motor L being in engagement with the other arm of the lever 28, and the piston n of the third motor or neutralizing motor being in engagement with both ends of the lever 29 through the medium of the cross bar n'. Thus, if it is desired that the elevating clutch be thrown to a position whereby the arm will be elevated, fluid under pressure is directed to the motor E which thereupon oscillates the shaft 27 so as to engage clutch 14 thereby to rotate the elevating nut 23 in a direction causing the arm to be elevated. Conversely, if fluid is directed to the motor L, the parts are shifted oppositely and the arm is lowered. To return the clutch spool to a neutral position thereby to discontinue the drive to the elevating nut 23, fluid is directed to the motor N. The piston n of this motor, it will be noted, is arranged to engage either arm of the lever 29 and, therefore, irrespective of the position of the clutch spool and lever 29, the parts are returned to an intermediate or neutral position immediately on the admission of fluid to the motor N.

Arm clamp

After the arm is moved to the desired position on the sleeve 3, it is adapted to be clamped thereto to maintain rigidity and accuracy during the tooling operation. For this purpose the arm clamping mechanism, indicated generally at B, Figs. 1, 5 and 9, is employed, which comprises essentially the clamp actuating motor C and the clamp levers 31 and 32. Referring particularly to Figs. 3 and 5, it will be noted that the girdle portion 4' of the arm, is split axially thereby forming two wing portions which partially surround the sleeve 3 and which are adapted to be drawn toward each other thereby to clamp the arm and sleeve together. The drawing together of the wind portion 4ª and 4ᵇ is effected by draw bolts 33 and 34 actuated by a movement of the levers 31 and 32. The levers 31 and 32 cooperate with the fulcrum studs 35 and 36 to effect relative movement between the members and thus draw the two portions of the arm girdle tightly against the sleeve 3. Movement of the motor C in one direction moves the levers outwardly to contract the arm girdle while movement of the motor in the opposite direction allows the levers to move inwardly (under the action of the expanding force of the girdle) thereby permitting the arm to free itself from the column.

Because of the downward turning movement of the arm, in a vertical plane about the column, a greater force is required at the upper rear portion of the guide to clamp same than the force required at the lower rear portion and, therefore, to equalize the stresses the levers 31 and 32 are made of unequal length, the longer of the two being arranged to clamp the upper portion of the girdle as shown. Further equalizing of the clamping forces results from the construction of the clamp actuating motor C in a manner now to be explained.

Referring to the enlarged detail of the arm clamping motor illustrated by Fig. 9, it will be noted that two pistons 37 and 38 are slidingly fitted within the cylinder 39 of the casing 40. Intermediate the inner ends of the pistons there is placed a floating connecting rod 41, the sides of which are provided with flat portions 42 and 43 and inclined portions 44. Rollers 45 and 45ª which are carried by translatable but non-rotatable plungers 46 and 47, engage the opposite faces of the equalizing link 41 and are moved outwardly thereby as the latter is moved endwise. The outer ends of the plungers 46 and 47 engage rollers on the ends of the respective levers 31 and 32 and thus actuate the arm clamp. With the parts in the position illustrated in Fig. 9, fluid under pressure has been admitted to the cylinder 39 behind the piston 38 and moved the latter to the unclamped position, that is, to the position shown where the rollers 45 and 45ª ride on the faces 42 of the floating connection 41, and the arm is unclamped; if fluid is then admitted to the opposite end of the cylinder behind piston 37 the block 41 will be moved to its other extreme whereby the rollers 45 and 45ª are moved outwardly by the inclined faces 44 and ride on the diametrically greater faces 43. The plungers 46 and 47 and likewise the ends of the levers 31 and 32 will then have been moved outwardly and the arm clamped to the sleeve.

It will also be noted that if one of the clamping levers 31 or 32 sticks or for any reason becomes fully clamped before the other lever, the block 41 is free to move laterally and thus transmitting to the said other lever a proportionately greater movement until each of the levers carries its predetermined portion of the clamp load. In this way it is assured that both ends of the arm girdle will be fully and equally clamped at all times. Lock nuts $33^a$ and $34^a$ are provided on the draw bolts 33 and 34 taking up the wear on the parts and for varying the clamp adjustment at the respective ends of the girdle $4'$.

Column clamp

Thus far the arm and sleeve are yet free to swing about the post 2 and unless the sleeve or the arm is maintained in a definite radial position with respect to the work, inaccuracy in the tooling operation results. A further feature of this invention relates to the clamping of the sleeve to the post which is accomplished herein by means of an hydraulic motor having a remote control therefor. This motor is illustrated more clearly in Fig. 3, and as there shown comprises a cylinder 48 within which is slidingly mounted a piston member 49 of the non-differential type. Intermediate the ends of the piston, rack teeth 50 are provided which mesh with the teeth of a gear segment 51 splined to the shaft 52. The shaft 52 extends lengthwise the post and is provided at its lower end with a cam element 53 as shown in Fig. 4.

The lower portion of the sleeve 3 is somewhat bell-shaped as at $3'$ and is slotted as at 54, thereby providing two wing portions $3^a$ and $3^b$, each of which is provided with bosses 55 through which the clamp bolt 56 passes. One end of the bolt is provided with an eye portion $56^a$ in which the cam element 53 rotates; the other end of the bolt is provided with a manually actuable lever 57 and adjusting nuts 58; and interposed between the portion 56 and the clamp lever 57 are the bosses of the two wing portions above mentioned.

To clamp the sleeve to the post by power, fluid is admitted to the cylinder 48 behind the piston 49 and moves the latter to the opposite position from that shown in Fig. 3. This movement oscillates the shaft 52 and cam 53 and thereby effects movement of the drawbolt relative to the wing portion $3^a$ and thus contracts the split portions of the lower end of the sleeve to clamp the sleeve and post together. When it is desired to unclamp the parts, fluid is admitted to the opposite end of the cylinder and which moves the piston to the position shown in Fig. 3, thereby permitting the wing portions $3^a$ and $3^b$ to expand and release the sleeve from the post.

Control

Each of the foregoing mechanisms, it will be noted, are located remotely from the operator's normal working position at the front of the tool head within easy reach of the spindle controls, and consequently there is considerable time lost in the course of even a day's work in traveling from one position to another in effecting the various adjustments to the machine for each operation. And not infrequently it not only happens that various elements of the combination are inadvertently left unclamped, but the operator will at times attempt to elevate or lower the arm when it is clamped, or conversely, thereby overloading the mechanisms and incurring possible fractures to parts thereof.

To overcome these difficulties and to render a machine tool more flexible and more easily controlled, this invention proposes the use of individual hydraulic motors for actuating the various mechanisms, as before explained, and to incorporate all controls therefor into a single unit operable from the normal working position of the operator.

This master control is in the form of a valve mechanism illustrated more clearly in Figs. 6, 7 and 8 and diagrammatically in Fig. 13 and comprises a ported casing element V within which two valve stems or rotors R and S are mounted. The rotor R, it will be noted, is provided with a cross port $r$ which is adapted, in certain positions thereof, to connect port $r^1$ with $r^2$ and the actuating fluid in the pressure line $p$.

The port $r^1$ connects with an annular chamber $s$ formed on the rotor S of the selector valve and which is constantly in communication with a central bore $s^2$ thereof by means of the radial aperture $s^1$. A somewhat similar annular groove $s^5$, spaced a distance from the groove $s$, partially encircles the rotor S and communicates with a bore $s^7$ that communicates with an exhaust chamber $s^8$, through the bore $s^6$. The chamber $s^8$ is connected with the reservoir $r^4$ by means of the conduit $r^3$. Intermediate the ends of the groove $s^5$ a connecting bore $s^3$, leading from the pressure chamber $s^2$, is adapted to direct fluid, under pressure, to any one of the radially arranged conduits $a$, $a^1$; $b$, $b^2$; $c$ or $c^1$, each one of which is operatively connected with the cylinders of the various motors previously mentioned.

Turning of the rotor S to any of its various positions is effected at the operator's position at the front of the drill head, through the medium of the hand actuator H which is attached to a tubular shaft $h^1$. The rearward end of the shaft $h^1$ carries a spiral gear $h^2$ which meshes with a similar gear $h^3$ keyed or splined to the rotor shaft $S^1$. A pointer element $h^4$ carried by the actuator H, cooperates with a suitable dial plate $h^5$, to indicate the required positioning of the valve for effecting operation of certain of the foregoing explained mechanisms.

After the rotor of the selector valve S has been set to the required position, the conduit $r^1$ is brought into communication with the pressure line $p$, merely by depressing the controller button K. Referring to Fig. 6, the button K is secured to an axially movable shaft $k^1$ which fits within the hollow shaft $h^1$ and has its inner end in engagement with a short lever $k^2$. The lever $k^2$ has a splined connection with the rotor shaft $R^1$ of the control valve R, so as to be slidable therealong in unison with movements of the head in the same manner as does the gear $h^3$ of the selector mechanism. Suitable means such as the spring $k^3$ is adapted to return the rotor R to its "off" position.

Both of the valves R and S are mounted in a single housing secured to a bracket at the inner end of the drill arm adjacent the column, as shown in Fig. 1, which has the advantage of reducing the lengths of the fluid conduits between the pump, valves, motors and reservoir and also eliminating the need for flexible fluid connections of any kind.

The conduits $a$ and $a^1$ convey fluid to and from the arm elevating clutch shifting motors L and E respectively; conduits $b$ and $b^2$ convey fluid to and from the elevating clutch motor N and to the respective ends of the arm clamping motor B; while conduits c and c¹ convey the fluid to and from the opposite ends of the column binder motor D, all of which are illustrated more clearly in the diagrammatic Fig. 13. With the parts in the position shown in this figure, the fluid pressure is about to actuate the clutch shifting motor L thereby to shift the clutch A whereupon the arm will be lowered. The passage of the fluid is as follows: The valve S has been positioned to connect the line a with the interior bore s² thereof, at which time, it will be noted, all of the other conduits a¹, b, b², c and c¹ are in communication with the channel s⁵ and the line r³ leading to the reservoir r. The operator then depresses button K, thereby oscillating the rotor R of the stop valve to the position illustrated in Fig. 13 and fluid under pressure passes from line p through the channels r, r¹, s, s¹, s² and s³ to the conduit a. From there, through the arm clamp motor B to the cylinder of the clutch motor L and extends the piston l thereof to the position illustrated in dotted lines in this figure. This movement of the piston l oscillates the clutchshaft 27 and throws the clutch spool 25 to the arm lowering position and the arm starts its downward movement.

To bring the arm to a stop, the selector valve is turned to a position that fluid will enter conduit b and actuate the clutch shifting motor N when the push button K is again pressed. It will be noted that after either of the arm elevating clutches have been rendered effective the clutch will remain engaged even though the button K is released and, therefore, the operator may reset the selector valve to the "stop" position during the movement of the arm so as to stop the movement thereof the instant it reaches the desired position merely by depressing the push button K.

The "stop" position mentioned is also the arm clamping position, so that not only is the elevating clutch returned to neutral but the arm clamp motor is actuated at the same time. Fig. 13 illustrates the arrangement of the conduits for accomplishing this result. A check valve T is inserted in the line b and which is adapted to maintain a back pressure in that line sufficient to operate the clutch motor N, the motor N receiving fluid from a point in the line b intermediate the valve T and the supply. After the piston of the motor N has been shifted (thereby returning the clutch A to neutral) the pressure of the fluid rises and shifts the piston t of the valve T against the action of the adjustable spring t². The movement of the piston t continues until a channel t³ formed therein is brought into communication with a port t⁴. During this interval the fluid exhausted from the motors L or E passes back through lines a or a' to the channel s⁵ and thence to the reservoir. Fluid under pressure then flows from the line b, through valve T, to line b¹ and thence to the chambers behind piston 37 of the arm clamping motor B (Fig. 9). The fluid thus directed actuates the arm clamp motor and the arm becomes clamped firmly to the sleeve. Fluid expelled from the opposite end of the arm clamp motor passes through the line b² to the chamber s⁵ of the selector valve and thence to the reservoir r.

Referring more particularly to Figs. 1 and 12, it will be noted, that the arm elevating screw shaft is normally maintained stationary in the sleeve cap 3ᶜ but is provided with a safety device X which yields and permits the screw shaft 24 to rotate with the elevating nut 23 whenever the arm member encounters an obstruction and/or the elevating mechanism is subjected to an undue load. Any device that will normally hold the screw shaft stationary but permit the same to rotate in either direction whenever the torque load applied thereto exceeds a predetermined value will be suitable for this purpose. Fig. 12 is a detail view of one form of such mechanism which operates briefly, as follows:

The upper end of the screw shaft 24 has keyed thereto a flanged sleeve member 100 which carries a plurality of spring pressed balls 101 that engage the inclined faces 102 of a stationary face cam 103. The balls are maintained in engagement with the cam faces by means of a heavy spring member 104, the opposite end of which engages a collar 105 adjustably carried by the screw shaft 24.

Under normal conditions of operation the torque applied to the screw shaft 24 is insufficient to move the balls 101 up the inclines 102, thereby compressing the spring 104, so as to permit the shaft to rotate. When, however, an undue load is placed on the elevating mechanism, such as will be caused if the arm strikes an abutment, the spring 104 will be compressed as the shaft 24 turns and the balls are forcibly moved over the inclined faces of the fixed cam plate 103.

To compensate for the weight of the arm and the parts carried thereby, which may exert a positive force when it is moved in one direction and a negative force when it is moved in the other direction, the cam faces 102 are preferably formed with a steeper pitch on one side than on the other so that the device does not slip when the arm is being elevated under normal operating conditions.

In this way there is provided a safety means for interrupting the action of the power elevating means should the arm strike against an abutment or should the operator inadvertently or accidentally fail to disconnect the clutch A before the arm reaches its limit of travel.

When it is desired to unclamp the arm, the selector valve is turned so that fluid under pressure is directed through line b² to the chamber behind the piston 38 of the motor which moves the latter to the position shown in the drawings Figs. 9 and 13. The movement of the piston to that position expels fluid from the opposite end of the cylinder back through line b¹, port t⁴, across the top of piston t, to the line r⁵ and the reservoir.

An important feature of this invention is the interlock between the arm clamping and elevating control and it has been brought out heretofore how the elevating clutches must first be returned to neutral before fluid is directed to the arm clamping motor for actuating the latter to bind the arm to the sleeve. The converse is true if the arm is clamped and it is desired to elevate or lower same by power. Referring to Figs. 9 and 13 the conduits a and a¹, leading to the elevating clutch shifting motors L and E first enter the arm clamping motor B where it will be seen a portion of the conduits comprise annular grooves a² and a³ formed on the pistons 37 and 38 respectively, and when the latter are in the position illustrated in these figures (arm unclamped) the channels a² and a³ line up with ports a⁴ and a⁵, and a⁶ and a⁷, thereby permitting an unrestricted flow of fluid to and from the clutch shifting motors L and E. Should the arm be clamped, however, the channels a² and a³ will be moved out of alignment with the ports a⁴—a⁵ and a⁶—a⁷ and no flow of fluid can take place to or from either of the motors L and E. Therefore, just as the elevating clutches must be returned to neutral before the arm may be clamped, so must the arm be fully unclamped before the elevating mechanism can be thrown into operation. In this way the danger of breakage caused by having two mechanisms working in opposition to each other is entirely obviated and the machine rendered more safe and dependable.

Clamping of the sleeve 3 to the post 2 is effected very much in the same manner, to wit, the selector valve is moved so as to connect the pressure channel $s^3$ with the line $c$ leading to the column clamp motor D. The piston 49 thereof is thereupon actuated and the gear segment 51 and cam shaft 52 moved in a clockwise direction (Fig. 3) to effect clamping of the sleeve to the post. The fluid discharged from the opposite end of the motor passes through line $c^1$ to the channel $s^5$ of the valve and thence to the reservoir. Reversely, to unclamp the sleeve the valve is repositioned so as to connect line $c^1$ with the pressure supply and the push button K again pressed as before.

The pump P is of the reciprocating piston type and is mounted in the gear box at the rear of the arm 4 as shown in Fig. 2. The lower portion of the gear box provides the reservoir $r$ to which the oil is returned from the several motors, previously explained, and from the gearing and shafting journaled in the arm. The pump in this disclosure is of conventional form and has two crank arms $p^2$ and $p^3$ which reciprocate the pistons. Fluid is drawn from the reservoir $r^4$ through the intake ports $p^4$ and $p^5$ which are submerged at all times in the liquid, and forces same through the pipe conduit $p$ to the valve R.

The entire output of the pump is of a value calculated to exceed the maximum requirements of the several motors and the surplus thereof utilized to lubricate the various gears and bearings in the gear box. However, in order that there be a sufficient pressure in the system to insure actuation of the clamp motors, etc., under all conditions of operation, an adjustable pressure relief valve $V^1$ is inserted in the pressure line $p$ intermediate the pump and the motors, preferably between the pump and the stop valve R. A branch conduit $p^8$ conveys fluid from the valve $V^1$ and discharges the fluid at the upper portions of the gear box to lubricate the gearing and shafting as it cascades downwardly over the mechanisms. The oil, aided by the movements of the parts and by gravity, finds its way to the reservoir where it is again pumped and recirculated.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of United States:—

1. A radial drilling machine combining a support; a rotatable sleeve member mounted thereon; an arm member translatably mounted on said sleeve; power means for translating said arm in reverse directions on said sleeve; means including an hydraulic motor for clamping said members one to the other; means including an hydraulic motor for rendering said power means operative to translate said arm in one direction; control devices for said hydraulic motors; and valve means actuated by said clamping motor adapted to render said controlling devices ineffective to cause actuation of said second mentioned hydraulic motor when the clamping motor is actuated to effect clamping of said members.

2. In a drilling machine the combination of a support member; a rotatable sleeve member mounted thereon; an arm member translatably mounted on said sleeve; power means including a reversing clutch mechanism having neutral and effective positions for translating said arm in reverse directions; a plurality of hydraulically actuated means for clamping said members one to the other; and fluid operated means automatically effective to move said clutch mechanism to its neutral position prior to and whenever the hydraulically actuated sleeve clamping means is rendered operative to effect clamping action.

3. In a drilling machine the combination of a support member; an arm member translatably mounted on said support; power means including reversing mechanism for translating said arm on said support; hydraulically actuated means for clamping said members one to the other; hydraulically actuated means for rendering said power means effective to translate said arm member on said support selectively in reverse directions; valve means remotely located from said hydraulically actuated means for controlling the action thereof; and fluid actuated auxiliary valve means for rendering one of said hydraulically actuated means ineffective when said other hydraulically actuated means is rendered effective.

4. A machine tool combining a plurality of relatively movable members; power means including a clutch for effecting movement of one of said members; clamping means for clamping said members one to the other; an hydraulic system including a pump and a plurality of hydraulic motors for actuating said clamping means and for operating said clutch, a system of fluid conduits between said pump and said motors; and control means for said hydraulic system including a stop valve and a selector valve for controlling and directing the flow of fluid to and from said motors selectively, said control means also including auxiliary and automatically operated valve means arranged to cooperate with said selector valve to prevent concurrent operation of one of said hydraulically operated clamping means and said hydraulically operated clutch means to their respective effective positions.

5. A drilling machine tool combining an upright support and a member movable thereon; power means including a clutch mechanism for effecting movement of said movable member; clamping mechanism for clamping said member to said support; an hydraulic system including a plurality of hydraulic motors for actuating said clamping mechanism and for operating said clutch mechanism, a pump element having a delivery capacity in excess of the requirements of said motors; a system of fluid conduits between said motors and the discharge side of said pump; control means for said system including a remotely controlled stop valve and selector valve for controlling and directing the flow of fluid to and from said motors selectively; and means for determining the maximum pressure in the pump discharge conduits and for by-passing the excess fluid delivered by said pump.

6. A radial drill combining an upright support; an arm member translatable on said support and provided with a translatable tool head; power means for translating said arm including a clutch mechanism; means operable to clamp said arm to said support; hydraulically actuated means controlled from said translatable tool head for operating said clamp mechanism and said clutch mechanism; and means comprising a fluid pressure operated device operatively associated with one of said hydraulically actuated means adapted to render the other of said hydraulically actuated means inoperative when its associated means is rendered operative.

7. A radial drill combining an upright support; an arm member translatable on said support and provided with a translatable tool head; power means for translating said arm including a clutch mechanism; means operable to clamp said arm to said support; hydraulically actuated devices for operating said clamping means and said clutch mechanism to an effective position; means carried by said translatable tool head for controlling the operation of said hydraulic devices selectively to translate said arm on said support or to clamp the arm thereto; and means other than said control means for rendering said clutch actuating device inoperative when said arm member is clamped to said support.

8. A machine tool combining two relatively movable members; power means for effecting relative movement therebetween; means operable to clamp said members in a predetermined relation to each other; an hydraulically actuated mechanism for operating said clamping means; hydraulically actuated mechanisms for rendering said power means effective and ineffective; a control device for controlling selectively the operation of said hydraulically actuated mechanisms; means independent of said control device for automatically insuring the operation of said hydraulically actuated clutch mechanisms to an ineffective position before the other mechanism is operated and for preventing the operation of the mechanisms rendered ineffective while the said other mechanism remains in an operative position.

9. A drilling machine combining two relatively movable members, one of which is adapted to carry a translatable tool head; power means for effecting relative movement between said members; hydraulically actuated means operable to secure said members in a predetermined relation to each other; hydraulically actuated mechanisms for rendering said power means effective; a control means carried by the translatable tool head for selectively controlling the operation of said hydraulically actuated mechanisms; and means including a pressure responsive device connected in series with said securing means for insuring the interruption of the action of said power means when said securing means is rendered effective.

10. A radial drilling machine combining a support; a rotatable sleeve mounted thereon; an arm member translatably mounted on said sleeve; power means for translating said arm in reverse directions on said sleeve; means including an hydraulic motor for clamping two of said members one to the other; means including an hydraulic motor for rendering said power means operative to translate said arm in either direction; control devices for said hydraulic motors; and means other than said control devices for rendering one of said motor operated mechanisms inoperative when the other motor operated mechanism is operative.

11. A machine tool combining a plurality of relatively movable members; power means including a clutch for effecting movement of one of said members; clamping means for clamping said members one to the other; an hydraulic system including a pump and a plurality of independent hydraulic motors for actuating said clamping means and for operating said clutch, a system of fluid conduits between said pump and said motors; control means therefor comprising a selector valve adapted to direct fluid supplied by said pump to the respective motors selectively, a stop valve for controlling the flow of fluid between said pump and said motors; said pump, selector valve, stop valve, and motors being serially arranged, and manually operable means for actuating said valves; a relief valve in said system and a branch conduit connected therewith for conveying lubricating fluid to the moving parts of said power means.

LAWRENCE LEE SCHAUER.
AUGUSTUS MARIUS SOSA.